United States Patent [19]

Perry et al.

[11] Patent Number: 5,160,015
[45] Date of Patent: Nov. 3, 1992

[54] SWEEPOUT APPARATUS AND METHOD

[75] Inventors: Jack I. Perry; Andrew B. Menzie, both of Toledo, Ohio

[73] Assignee: Owens-Brockway Glass Container Inc., Toledo, Ohio

[21] Appl. No.: 563,980

[22] Filed: Sep. 9, 1991

[51] Int. Cl.⁵ .............................................. B65G 25/00
[52] U.S. Cl. ............................... 198/468.01; 198/740; 65/375
[58] Field of Search .................. 198/468.01, 739, 740, 198/741; 65/375, 348, 260

[56] References Cited

U.S. PATENT DOCUMENTS

4,199,344 4/1980 Mumford et al. ...................... 65/260
4,427,431 1/1984 Mumford et al. ...................... 65/163
5,037,466 8/1991 Voisine et al. .............. 198/468.01 X
5,061,309 10/1991 Mungovan et al. ....... 198/468.01 X Primary Examiner—Robert P. Olszewski
Assistant Examiner—Cheryl L. Gastineau

[57] ABSTRACT

A shuttle type sweepout mechanism is described wherein the 90° sweepout that consists of rotary head driven through an arc is mounted on a support that is translated in the direction of the moving conveyor. With the sweepout head capable of being rotated and translated makes it feasible to have an array of deadplates that are in alignment but at different distances from a pair of parallel conveyors that transport the ware to the lehr.

5 Claims, 6 Drawing Sheets

SWEEPOUT APPARATUS AND METHOD

BACKGROUND OF THE INVENTION

This invention relates to a method and apparatus for moving newly formed glass containers from the cooling deadplate to the moving machine conveyors that pass by in front of the forming machines of the individual section type. The machine conveyors for a ten section machine have one conveyor that runs the full length of the ten sections with the second conveyor running in front of only the last five of the sections. In this way, the line speed of the conveyors can be half as fast as they need to be if all the ware were being handled by only one conveyor. Since the two conveyors are running side-by-side it is necessary that the first five sections have a means or sweepout that will move the containers onto the farthest conveyor while the next five sweepouts may be of conventional design for moving the ware to the nearest conveyor.

The prior art, such as that disclosed in U.S. Pat. No. 4,793,465, shows two conveyors being used to transport the containers from the forming machine to the lehr. However, there is nothing that explains how the containers are moved from the machine sections to the conveyor surfaces. The conventional transfer mechanisms are called "sweepouts" since they, in effect, engage the ware that is sitting on the "cooling deadplate" and slide the ware with a sweeping action from the deadplate to the moving surface of the conveyor. Since the conveyors are at different distances from the deadplates of the first five sections as compared to the second five, the mechanisms must be of different designs in order to handle the ware. The present invention uses identical sweepout heads and drive motors for all of the sweepouts, but with the ability to shuttle the sweepouts, that are associated with the first set of machine sections, toward the conveyor as the sweepout arm is being rotated to slide the ware from the machine sections to the conveyor. In this way only one style and size of sweepout is required for all of the sections.

The sweepout head, per se, is not new, having been disclosed in U.S. Pat. No. 4,427,431, of common assignee with the present case. Reference may be had to this Patent for details of the structure of the sweepout mechanism and the programmable controller for the drive motor.

In the operation of the typical, quadruple cavity, ten section glass forming machine, all of the blow molds of a section are in a line that is perpendicular to the conveyor belt, and parallel to each other. The takeout mechanism has tongs which grasp the neck of the were as they sit in the molds and when the mold is opened the takeout arm is driven so that the ware is moved through an arc of 180° in the vertical plane to a cooling dead plate. The ware is released to the dead plate and rests on its base as it is being swept from the deadplate to the conveyor. It is the sweepout mechanism and its operation that is the principal subject of this invention.

It is an object of this invention to provide a system for sweeping containers resting on the first set of deadplates, the extra distance onto the outside conveyor belt of the dual machine conveyor.

It is a further object of this invention to provide a shuttle sweepout that requires no modification of the takeout mechanism; head or arm, or the sweepout rotary actuator and cylinder.

It is an additional object of this invention to provide a sweepout mechanism that does not impose excessive forces on the soft glass container during the transfer to the conveyor because of excessive speed or acceleration.

It is a still further object of this invention to provide a sweepout system that does not sacrifice mold cooling time or deadplate cooling time in order to perform the transfer of the ware.

Other and further objects will be apparent from the following description taken in conjunction with the annexed sheets of drawings wherein;

DETAILED DESCRIPTION OF THE INVENTION

Figures 1, 2:
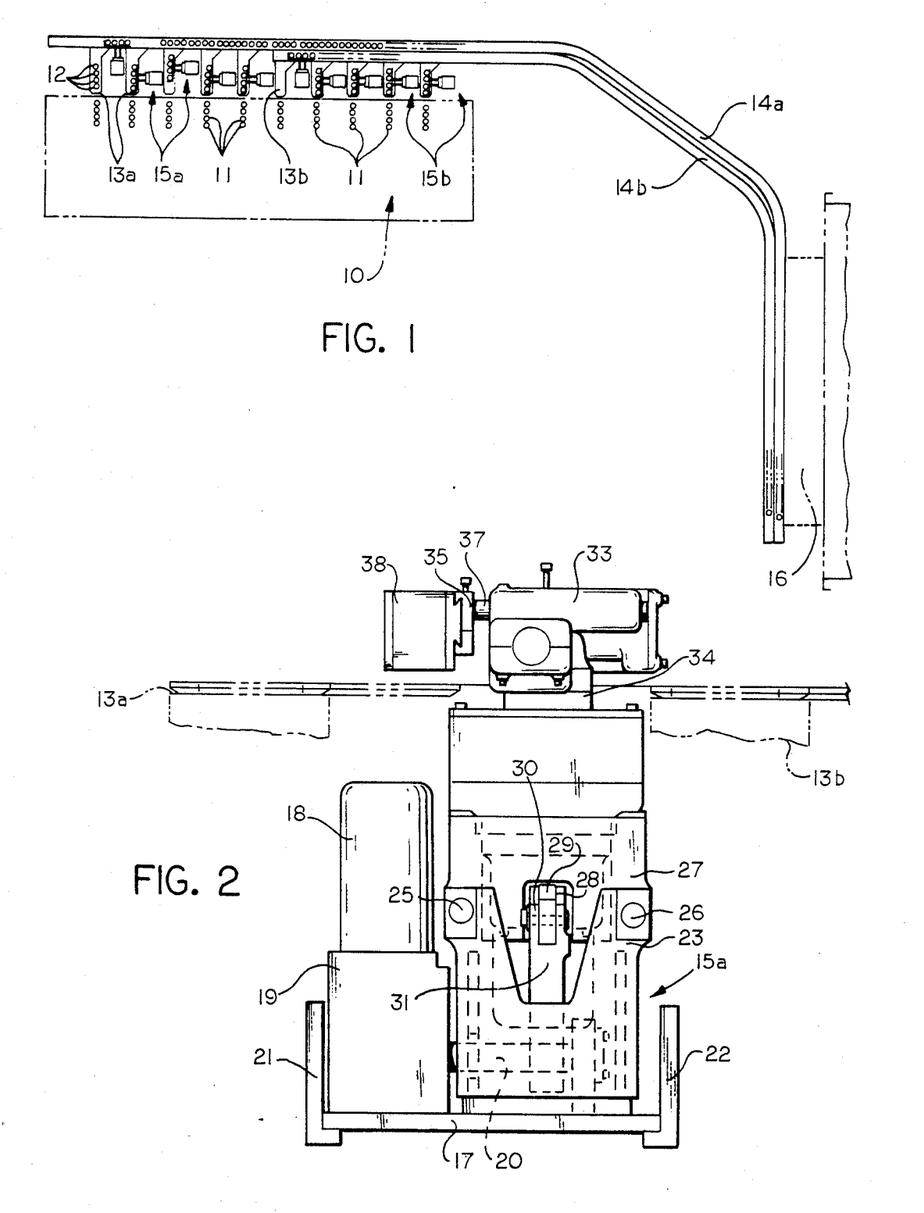
FIG. 1 is a top plan view of the sweepout and conveyor system layout incorporating the invention.
FIG. 2 is an end elevational view of the shuttle sweepout mechanism of the invention.
Figure 3:
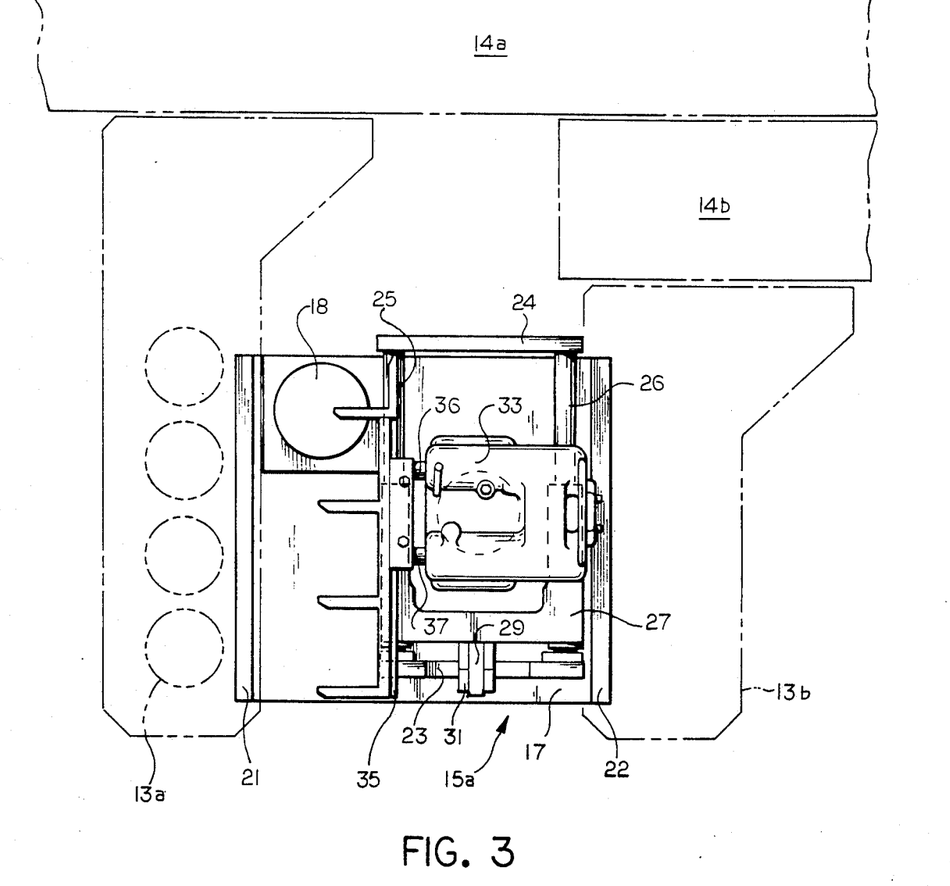
FIG. 3 is a top plan view of the shuttle sweepout of FIG. 2.
Figure 4:
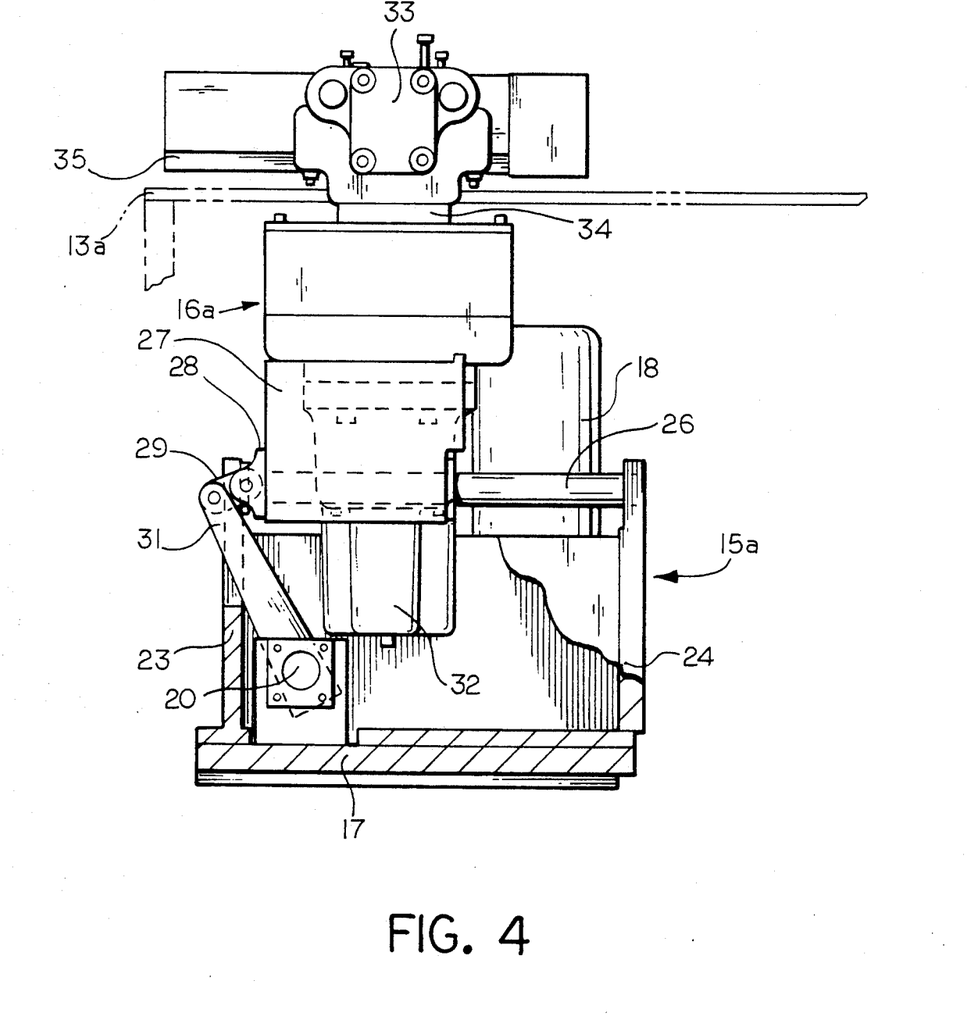
FIG. 4 is a side elevational view of the shuttle sweepout of FIG. 2, and FIGS. 5–10 are a series of plan views illustrating the sequence of operation of the shuttle sweepout of the invention.

With particular reference to FIG. 1, the general layout of the system for transferring newly formed containers from the forming molds to the annealing lehr can be explained in terms of how a 10-section I.S. type glass forming machine that is making four containers on each section can transfer the containers without damaging the ware as it is being transferred. The 10-section machine is represented by an outline 10, with the small circles 11 representing the blow molds on each of the sections from which the newly formed ware 12 is transferred by conventional take-out mechanism that deposits the ware on elongated cooling deadplates 13a and 13b. The ware 12 that is positioned on the deadplate 13a is swept from the deadplate 13a to a moving conveyor 14a by the "sweepout" mechanism, generally designated 15a. Similarly, the sweepout mechanism 15b will sweep the ware from the deadplate 13b to a conveyor 14b that is running parallel to the conveyor 14a. As can readily be seen the conveyors 14a and 14b extend from the forming machine 10 to pass in front of an annealing lehr 16. The ware is then moved from the conveyors into the lehr. The subscripts "a" and "b" are used to indicate that the sweepouts 15a will move ware to the conveyor 14a from the deadplates 13a while the sweepouts 15b will transfer the ware to the conveyor 14b. It should also be noted that the deadplates 13a and 13b are of different lengths, as will be made clear in conjunction with the description of FIGS. 5–10.

Turning now to FIGS. 2–5 the detail of the shuttle type sweepout 15a, of the invention, will be described. The particular sweepout shown in FIGS. 2–5 is the one that is the fifth to the right in FIG. 1, and next to the first sweepout 15b of the second set of five forming machine sections.

A fixed horizontal base member 17 serves as the support for a vertically positioned, programmable A.C.-servo brushless sweepout actuator 18 and gear box 19 that has its input shaft driven by the actuator. The gear box 19 has an output shaft 20 that extends to the right, in FIG. 2. The base 17 is supported by vertical side walls 21 and 22 that are fixed to floor supported frame members, not shown. The base plate 17 also serves as the mounting member for a pair of vertical, spaced apart, end walls 23 and 24.

Extending between the end walls 23 and 24, adjacent the top thereof, are a pair of horizontal rods 25 and 26. These rods serve as tracks or slideways for bushings carried by a sweepout servo-motor, mounting block 27. The mounting block 27 is free to move toward and away from the conveyor 14a on the rails or rods 25 and 26. Attached to the mounting block is a clevis 28 that is pinned to a link 29 that in turn is pinned to the bifurcated end 30 of a crank arm 31. The crank arm 31 has its other end fixed to the output shaft 20 of the gear box 19. Thus it can be seen that the motor mounting block 27 is moved toward or shuttled toward the conveyor 14a under the control and power of the programmable servo actuator 18. The rate at which the mounting block is moved toward and away from the conveyor is thus under the control of the actuator. The actuator 18, which may be a stepper type motor, is in turn, controlled by a programmable controller so that its motion is very carefully monitored to avoid moving the hot glass containers at a velocity that might distort them or cause defects to be formed in them by reason of the way in which they are handled. Furthermore, the motor 18 can have its entire motion profile, both as to rate and distance, changed as required for different weight and size of container being produced. It should be understood that the shuttle motion is to be carried out simultaneously with the rotary motion of the sweepout head as explained hereinafter.

The block 27 carries a servo type, drive motor 32 of the kind disclosed in U.S. Pat. No. 4,427,431, in FIGS. 4–7 thereof. As shown in U.S. Pat. No. 4,427,431, the drive motor (47) has its drive shaft coupled to a resolver and tachometer. The same is true of the drive motor 32 of the present invention, in that it is essentially the same sweepout motor as that disclosed in the Patent and it also has a finger extending and retracting motor 33 mounted on its upper mounting block or surface 34. The motor 33 is disclosed in detail in U.S. Pat. No. 4,199,344, issued Apr. 22, 1980. The motor 33 is a dual piston, pneumatic motor that carries a finger mounting bar 35 attached to the extending ends of the piston rods 36 and 37. A plurality of fingers 38 are mounted to the bar 35 and extend at right angles thereto. The fingers are spaced from each other a predetermined amount depending on the size and spacing of the containers since they are to engage the containers and move them through an arc of 90° to place them on the moving surface of the conveyor. The timing of the motions is carefully regulated from a central processor that is programmable to provide the optimum handling of the ware. It can also be seen that with the present setup of separate conveyors for carrying the hot ware to the lehr, the movements can be much slower than if all of the ware was to be moved by a single conveyor as was done in the past when the forming machines were producing only two or three containers at a time rather than four as is the case in the high production machines that are becoming more prevalent.

Figure 5:
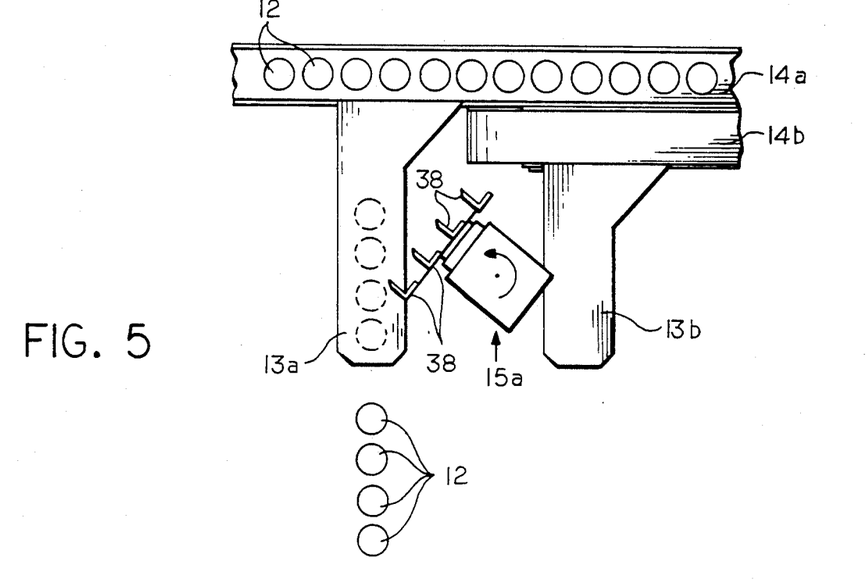
Figure 6:
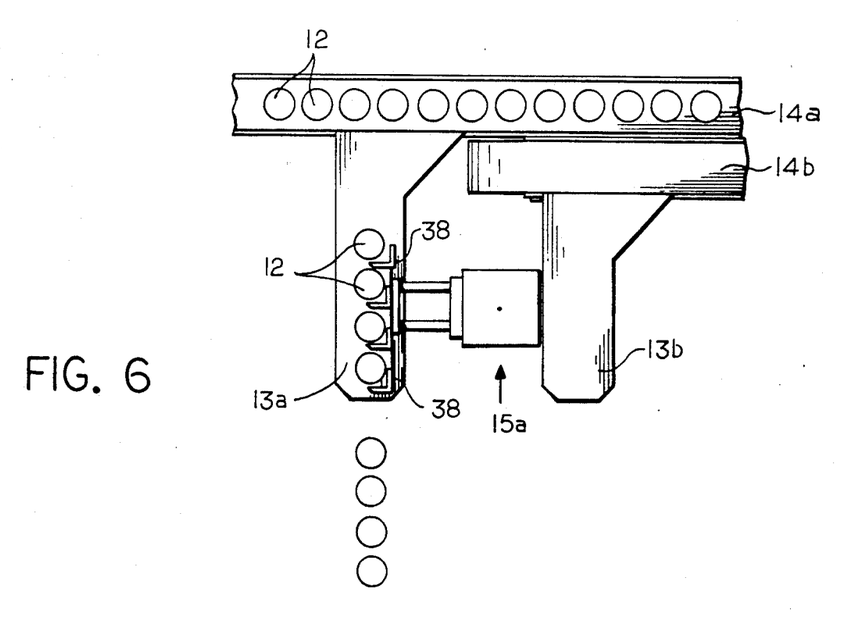

The sequence of operation of the shuttle type sweepout of the present invention is shown in FIGS. 5–10. In FIG. 5 the sweepout head 15a, with retracted fingers, is at its reverse position and is rotating in a counter clockwise direction. This rotation will continue until the head is in the position shown in FIG. 6. Once the head has reached the position where its fingers are facing the deadplate 13a, the fingers are extended to the position shown in FIG. 6. Just prior to this time, the containers 12 which had been sitting at the blow molds (see FIG. 5) were placed on the deadplate 13a so that the fingers 38 will extend between the individual containers as shown in FIG. 6.

Figure 7:
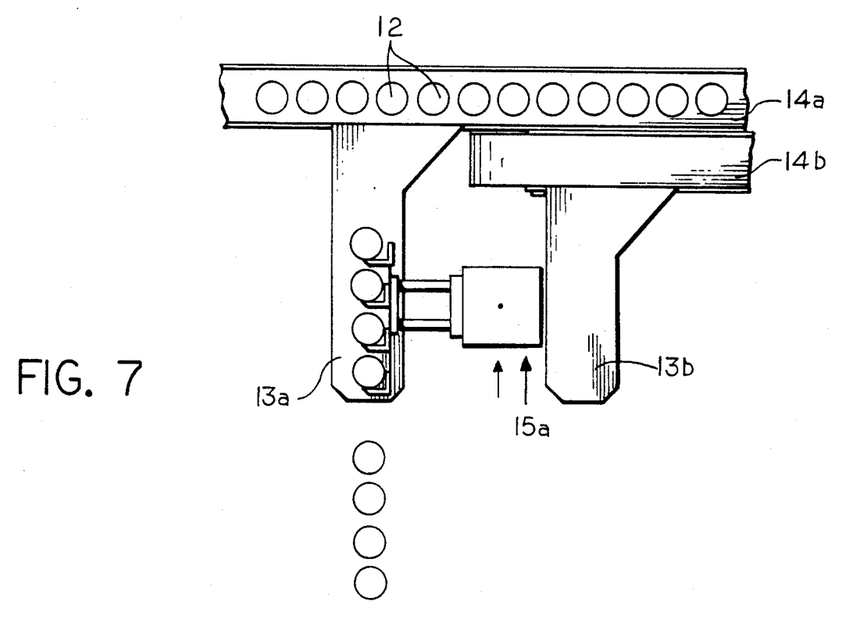
Figure 8:
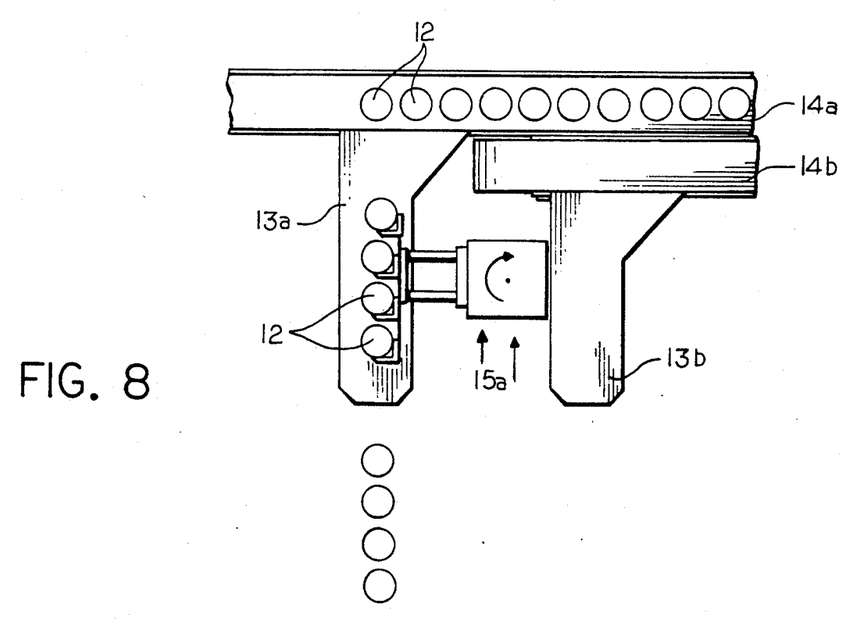
Figure 9:
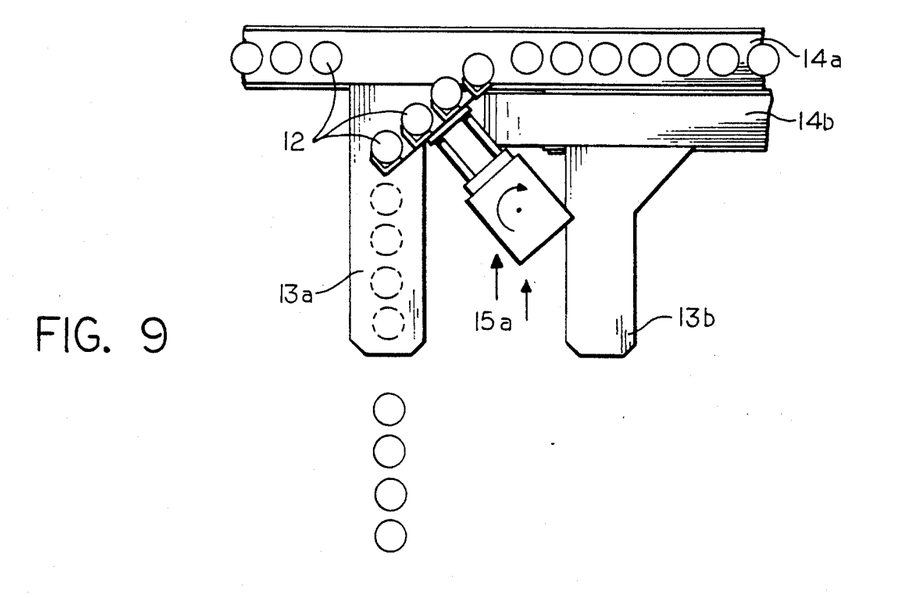
Figure 10:
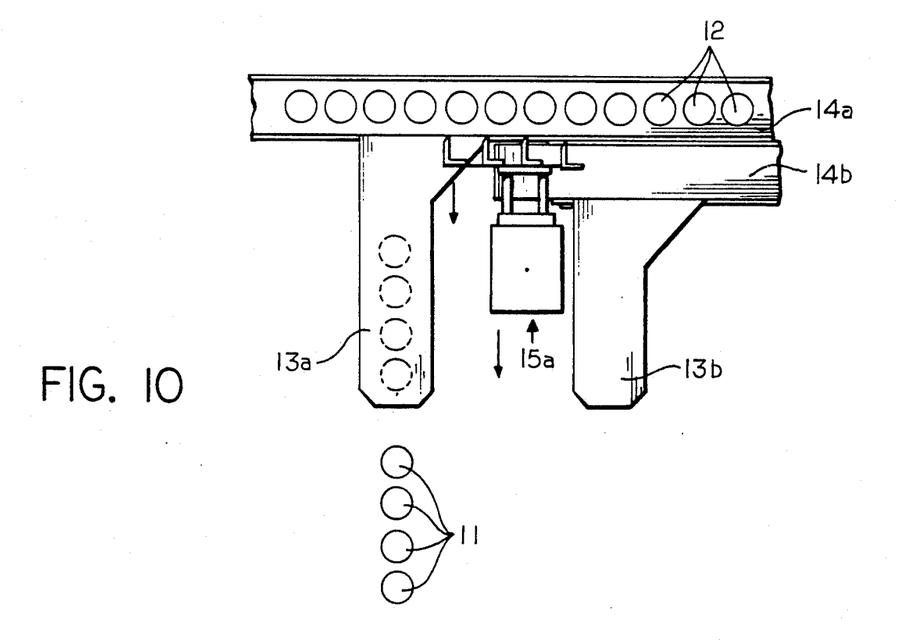

Once the fingers are in position, the forward translation of the head 15a begins as depicted in FIG. 7. This movement will begin the motion of the ware toward the conveyor 14a. The translation motion will continue at a preselected rate and the head 15a begins its rotation in a clock-wise direction as shown in FIG. 8. This translation and rotation of the head 15a continues as illustrated in FIG. 9 and the ware 12 is moved from the deadplate to the moving surface of the conveyor with a smooth motion and at a rate that will not place any stress on the hot container. Once the rotation of the head is complete, the fingers 18 are retracted as shown in FIG. 10, and the head 15a begins its reverse translation. The reverse translation continues and the head is rotated counter clock-wise as illustrated in FIG. 5 and the cycle begins again.

In view of the foregoing description, it can be seen how the containers are moved from the cooling deadplates 13a onto the moving conveyor with a minimum of stress on the hot ware. It should be apparent that the ware produced on the next adjacent forming machine that has the deadplate 13b will use a non-shuttle type sweepout head since the distance to the conveyor is within the sweep of the head.

While the best mode contemplated in carrying out the invention has been described, it should be apparent that other modifications may be resorted to without departing from the scope of the invention as set forth in the appended claims.

What is claimed:

1. A sweepout mechanism for moving newly formed glass containers from cooling deadplates of a series of glass forming machine sections to a machine conveyor system that is composed of two side-by-side conveyors running parallel to each other with a first conveyor extending beside the deadplates of the first half of the forming machine sections with the distance from the deadplates to the conveyor for the first half of the forming machine sections being greater than the distance from the deadplates of the other half of the forming machine sections to the second conveyor and wherein the deadplates are all the same distance from the forming machine sections, a sweepout head mounted adjacent each deadplate and all of the sweepout heads are of the same design and operation; the improvement comprising means connected to the sweepout heads of the first half of the forming machine sections for shifting the heads in the direction of the first conveyor as the sweepout engages the containers and during the continued movement of the sweepout as it moves the containers onto the first conveyor surface, said means for shifting the heads, shifting the vertical axis of the first half sweepout heads a distance which is equal to the relative spacing of the centerline of the first and second conveyors.

2. The apparatus of claim 1, wherein said means for shifting the first half sweepout heads comprises a plurality of horizontally reciprocable slide members each with one of the heads supported thereby, an electronically programmable motor connected to each slide member for moving the slide member toward and away from the conveyor at a preselected velocity.

3. The apparatus of claim 2 wherein the programmable motor is an A.C. brushless servo actuator.

4. A method of moving newly formed glass containers from a series array of cooling deadplates to the surface of one of a pair of moving conveyors that are of unequal distance from the array of deadplates, the steps of sweeping those containers that are positioned on deadplates that are adjacent the closest conveyor by engaging their sides with sweepout fingers that move in an arc about a stationary axis, engaging the remainder of the containers with sweepout fingers that are moved in a linear direction toward the conveyor and in an arc about a vertical axis that is moving toward the conveyor.

5. In the method of claim 4, wherein the movement of the remainder of the containers is by a combined translation and rotary motion of a sweepout head.

* * * * *

UNITED STATES PATENT AND TRADEMARK OFFICE
CERTIFICATE OF CORRECTION

PATENT NO. : 5,160,015
DATED : Nov. 3, 1992
INVENTOR(S) : Jack I. Perry et al.

It is certified that error appears in the above-identified patent and that said Letters Patent is hereby corrected as shown below:

On the title page, item [21], "563,980" should read --756,398--.

Signed and Sealed this

Twenty-ninth Day of March, 1994

Attest:

BRUCE LEHMAN

Attesting Officer     Commissioner of Patents and Trademarks